Sept. 20, 1932.                P. J. N. MILLER ET AL                1,878,968
                                      TOASTER
                              Filed Jan. 9, 1929           2 Sheets-Sheet 1
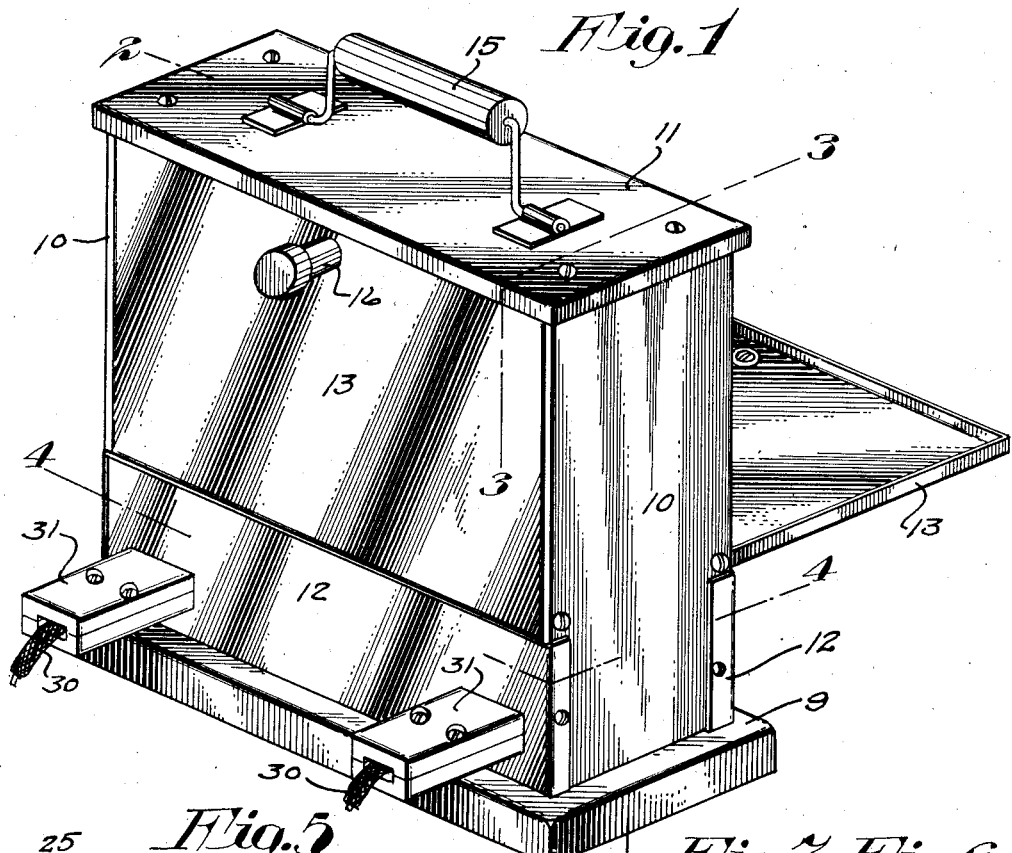
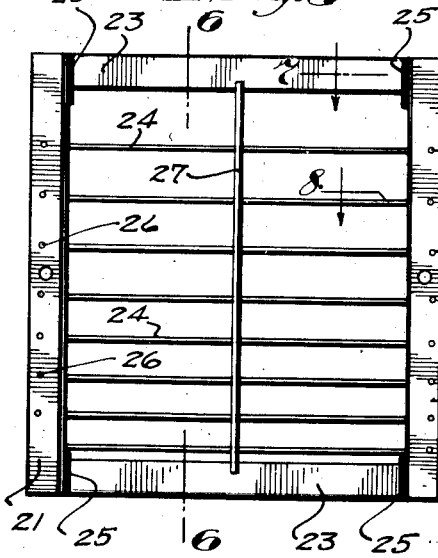
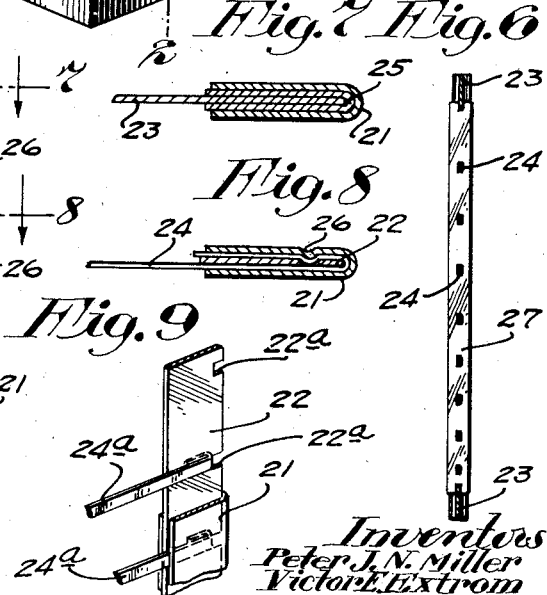
Inventors
Peter J. N. Miller
Victor E. Extrom
By their Attorneys
Merchant & Kilgore

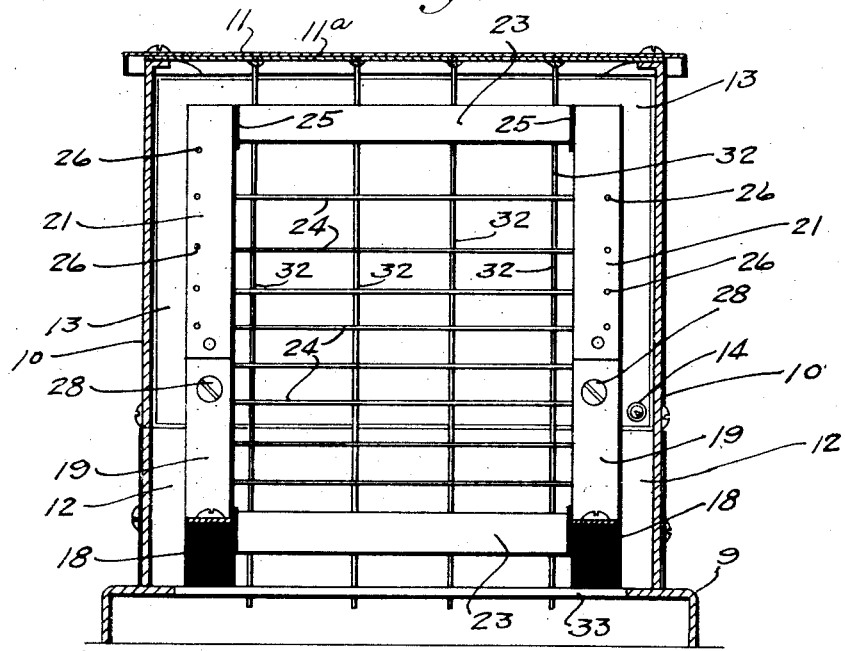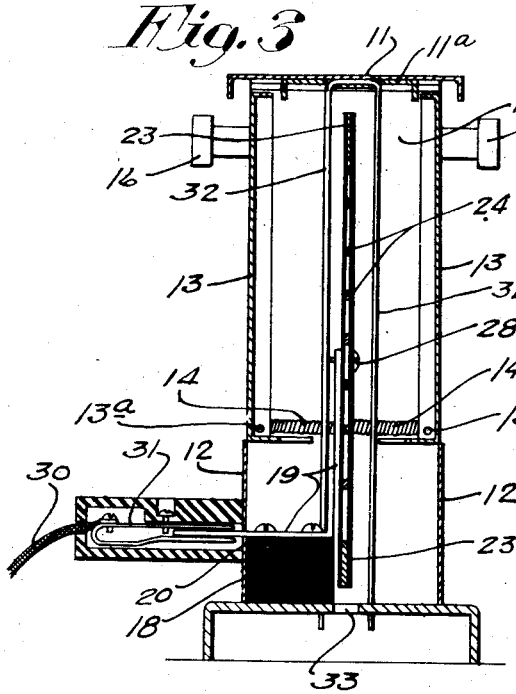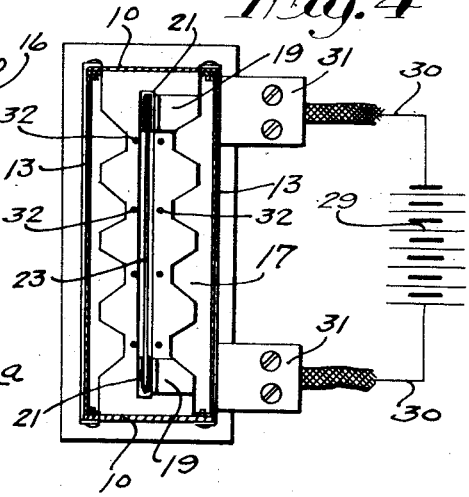

Patented Sept. 20, 1932

1,878,968

UNITED STATES PATENT OFFICE

PETER J. N. MILLER AND VICTOR E. EXTROM, OF MINNEAPOLIS, MINNESOTA

TOASTER

Application filed January 9, 1929. Serial No. 331,270.

Our present invention provides an extremely simple and highly efficient electrical toaster having a heating element of novel construction and arrangement especially well adapted for low tension current such as afforded by the ordinary automobile battery and from which statement it follows that this improved toaster is adapted for use by tourists and in connection with their automobile.

Generally stated, the invention consists of the novel devices, combinations of devices and arrangement of parts hereinafter described and defined in the claim.

The commercial form of the device is illustrated in the accompanying drawings, wherein like characters indicate like parts throughout the several views.

Referring to the drawings:

Fig. 1 is a perspective showing the improved toaster;

Fig. 2 is a vertical section taken through the toaster approximately in the plane indicated by the lines 2—2 on Fig. 1;

Fig. 3 is a vertical section taken through the toaster in the plane indicated by the lines marked 3—3 on Fig. 1;

Fig. 4 is a horizontal section taken in the plane indicated by the lines marked 4—4 on Fig. 1;

Fig. 5 is a side elevation showing the complete electrical heating element removed from the toaster;

Fig. 6 is a section taken on the line 6—6 of Fig. 5;

Figs. 7 and 8 are fragmentary enlarged sections taken respectively on the lines 7—7 and 8—8 of Fig. 5; and Fig. 9 is a fragmentary detail in perspective showing a slight modification in the construction of the heating element.

The casing of the toaster is preferably a rectangular structure made up of a base 9, end plates 10, top plate 11, lower front and rear plates 12 and hinged doors 13. The doors 13 are hinged to the plates 12 at their lower edges and are normally held closed by light coiled springs 14. The top plate 11, as shown, is provided with a carrying handle 15 and the hinged doors 13, as shown, are provided with outwardly projecting knobs 16. The springs 14 are preferably connected to the two doors 13 slightly above their hinge pivots 13ª. At their lower edges the doors 13 are provided with notched inwardly projecting flanges 17 that support the bread slices when the bread to be toasted is placed on the inner surfaces of the doors. Secured on the base 9 within the lower portion of the casing are spaced insulating blocks 18 on which are secured rectangular metallic conducting strips 19 the horizontal portions of which project outward through perforations 20 formed in the front plate 12 and, of course, without contact with said plate. The vertical portions of the strips 19 are located in a plane that is nearly midway between the front and rear of the casing and they are arranged to support the heating element presently to be described.

The term heating element is herein used to designate a complete heating unit which, as preferably constructed, comprises channel shape metallic bars 21, spaced buss bars 22, top and bottom spacing bars 23 and heat radiating wires 24 that are preferably very thin and flat members. The ends of the upper and lower bars 23 are clamped within the upper and lower ends of the channel bars 21 and firmly held thereby but are insulated therefrom by interposed sheets of insulating material 25 such as mica, see particularly Fig. 7.

The flat wires 24 are bent around the buss bars 22 and by the channel bars 21 are firmly held against said buss bars, as best shown in Fig. 8. By this arrangement the several wires 24 are connected in multiple. The grip between the members 21, 22 and 24 can be increased by producing indentations as shown at 26 in Fig. 8 and the same indentation can be produced to increase the frictional grip between the members 21 and 23. Preferably the wires 24 at their central portions are further spaced by an insulating strip 27 through which they are passed and the ends of which strip are notched to embrace the upper and lower bars 23.

The channel bars 21 are rigidly but detachably secured to the vertical portions of the conducting strips 19 preferably by screws 28. By this arrangement the current for producing the toasting action may, as already stated, be afforded by an automobile battery 29 of low tension current, the leads 30 of which are provided with coupling sockets 31 adapted to be slipped onto the projecting ends of the conducting strips 19. Automobile batteries are usually six volt batteries but some thereof have as much as twelve volts. To produce a toasting action with these low voltage batteries requires a comparatively large flow of current and this we find can be done by connecting the heating wires or heat members of the same heating element in multiple rather than in series which latter has been the customary arrangement and is suitable only for high voltage.

To hold the bread properly away from the heating element there is provided laterally spaced grids shown as made up of U-shaped wires 32 the tops of which are suitably anchored to the top plate 11 and the legs of which extend downward on the opposite sides of the heating element and are passed through the base 9 on opposite sides of an elongated passage 33. The heating element is adapted to be readily inserted to working position and removed therefrom through the passage 33. The U-shaped wires 32, as shown, are anchored to the top plate 11 of the casing, so that when the top plate 11 is removed the wires 32 will be removed therewith and when the top plate is placed in position the lower ends of the wires will be passed through holes in the bottom plate or base of the toaster. Obviously, this toaster can be used wherever suitable current supply is available.

Obviously, with this device two slices of bread may be toasted at one time on one side but the slices will have to be reversed to complete the toasting operation. The device is very simple and may be cheaply constructed and at the same time it is efficient, strong and durable. In the construction illustrated in Fig. 9, the buss bar 22 is provided with notches 22ª through which the bent ends of the heating wires or strips 24 are extended but otherwise the structure of the heating element will be as previously described. The heating element has been found highly efficient for low tension current supplied by low voltage batteries such as is used in automobiles and as before indicated the toaster will be found a desirable device for use in connection with automobiles by tourists and others who may desire to toast bread when out in the country or elsewhere with an automobile.

What we claim is:

In a toaster a casing having a base and hinged doors, rectangular conducting strips secured to said base but insulated therefrom and positioned with horizontal portions projecting from the casing and with vertical portions located centrally of the casing, and an electrical heating element comprising spaced bars insulated from each other, and radiating wires connected across said bars, said bars being detachably secured to the upright portions of said conducting strips.

In testimony whereof we affix our signatures.

PETER J. N. MILLER.
VICTOR E. EXTROM.